UNITED STATES PATENT OFFICE.

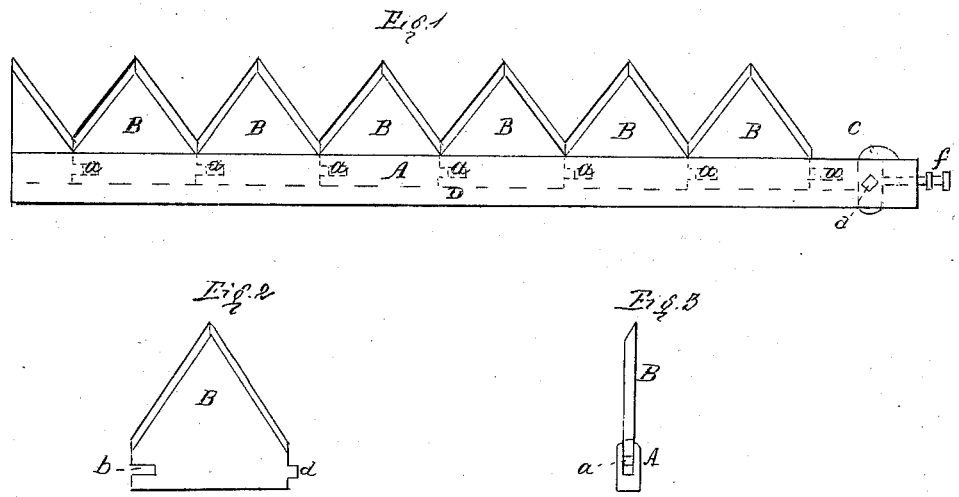

JOHN T. NORRIS, OF TIFFIN, OHIO.

IMPROVEMENT IN HARVESTER-CUTTERS.

Specification forming part of Letters Patent No. 78,889, dated June 16, 1868.

*To all whom it may concern:*

Be it known that I, JOHN T. NORRIS, of Tiffin, in the county of Seneca, and in the State of Ohio, have invented certain new and useful Improvements in Knives and Knife-Bars for Reapers and Mowers; and do hereby declare that the following is a full, clear, and exact description thereof, reference being had to the accompanying drawings, and to the letters of reference marked thereon.

The nature of my invention consists in the manner of fastening the knives of a reaper and mower to the knife-bar, by means of pins put through the sides of the bar, and slots and lugs on the base of the knives, in such a manner that the slot on one knife fits tight over the pin in the bar and lug in the next knife, the bar being made with a square back, and one end thereof provided with a wedge and set-screws to hold the knives firmly against each other.

The object of my invention is to afford better facilities for grinding the knives, and also for replacing broken ones with others, as the knives can be easily taken out by loosening the set-screws and taking out the wedge.

In order to enable others skilled in the art to make and use my invention, I will now proceed to describe its construction and operation, referring to the annexed drawings, which form a part of this specification, and in which—

Figure 1 is a side sectional view of the bar with the knives attached; Fig. 2, a side view of a knife, and Fig. 3 is a vertical section.

A represents the knife-bar, made of two side pieces and a middle piece, D, forming a square back for the knives to rest on. The ends of the bar are solid. This bar may also be made of one piece, bent over, but forming a square back. The pins $a$ $a$ are put through the sides of the bar A, at suitable distance from each other, to fit into the slots on the base of the knives.

The knives B B are made in the same manner as the ordinary knives for a reaper and mower, but are provided on one side of their base with a slot, $b$, and on the other with a lug, $d$, as shown in Fig. 2, and are so constructed that when inserted in the bar A they will fit exactly in between the sides thereof, and rest squarely on the back or middle piece D. The slot $b$ will admit of the knife being slid so that the pin $a$ comes in the slot, and the knife will be close up to the adjoining knife, the lug $d$ thereof fitting nicely into the same slot.

When all the knives have been inserted in like manner, the wedge C is inserted, which wedge drives the knives closely and firmly together; and this wedge is held tight, to prevent any possibility of its loosening or falling out, by means of a set-screw, $f$, through the solid end of the bar, and also by another set-screw, $e$, on the side of the bar.

The object of having two set-screws is, that should by any accident one of them be broken, the other will still hold the wedge in its place.

Having thus fully described my invention, what I claim as new, and desire to secure by Letters Patent, is—

1. The knife B, provided with slot $b$ and lug $d$, substantially as and for the purposes herein set forth.

2. The combination of the knife B, as constructed, with the bar A, provided with pins $a$ $a$, set-screws $e$ and $f$, and wedge C, or their equivalents, substantially as and for the purposes herein set forth.

In testimony that I claim the foregoing I have hereunto set my hand.

J. T. NORRIS.

Witnesses:
 A. H. YEATMAN,
 LEOPOLD EVERT.